United States Patent Office 3,404,925
Patented Oct. 8, 1968

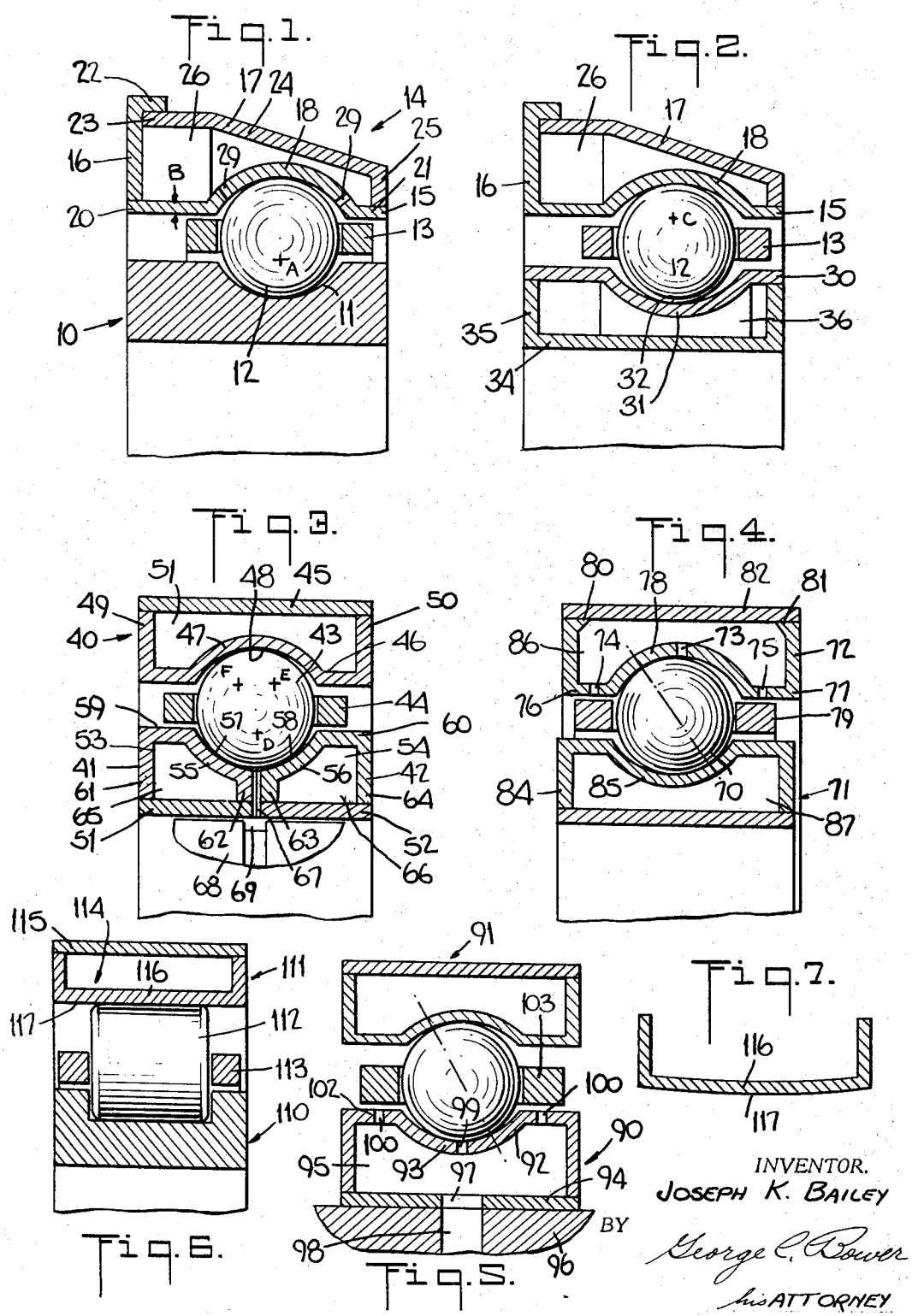

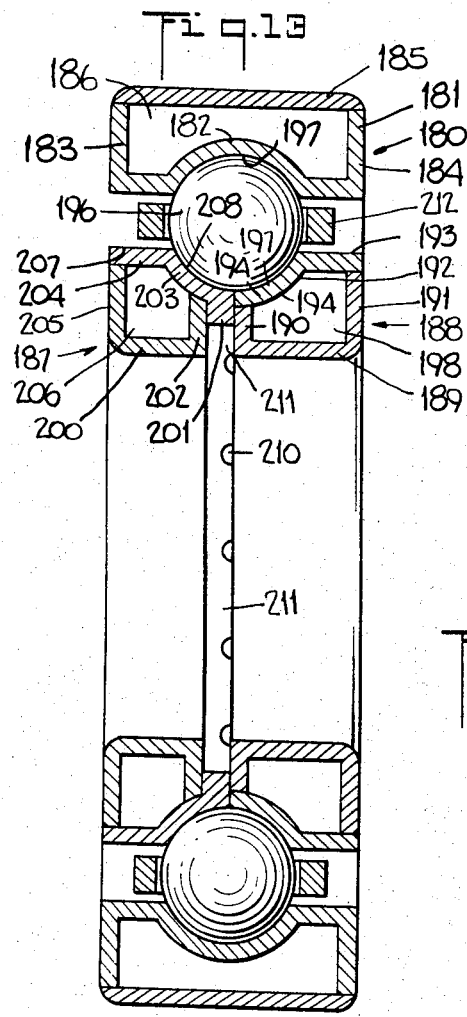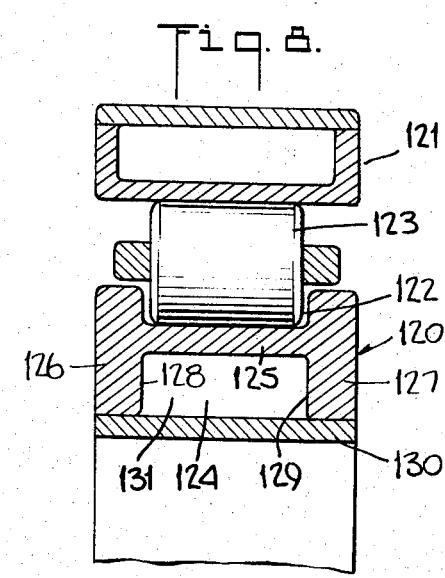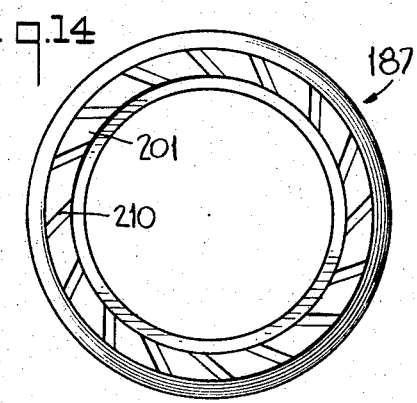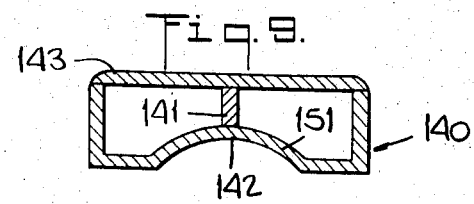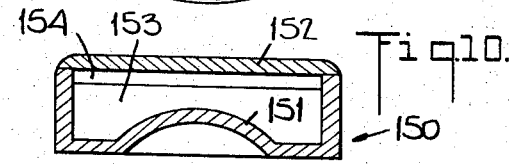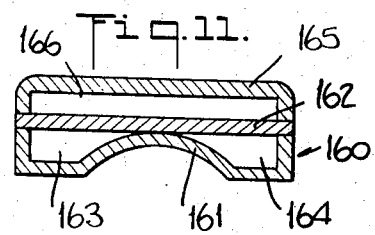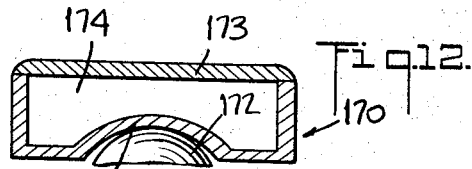

3,404,925
BEARING WITH HOLLOW RINGS
Joseph K. Bailey, Lakewood, N.Y., assignor to TRW Inc.,
Euclid, Ohio, a corporation of Ohio
Filed May 12, 1966, Ser. No. 549,700
11 Claims. (Cl. 308—184)

ABSTRACT OF THE DISCLOSURE

The bearing has hollow rings preferably made from sheet metal to form the axial walls of the bearing with the bearing surfaces having a substantially greater width than thickness to render the walls controllably yieldable in relation to the antifriction members. The wall of one of the members has an annular strut for controlling the yieldability of the walls. Coolant flows in the hollow rings. This coolant may be a lubricant and holes may be provided to introduce the lubricant adjacent to the bearing surfaces.

---

This invention relates to bearings having rolling antifriction elements, such as balls, and is directed particularly to the rings forming the races engaged by the antifriction elements.

In the present commercial bearings with rolling antifriction elements, the outer and inner rings are solid and are usually made from a tubular steel. The rings are shaped by machining and grinding with the races in the cylindrical ring surfaces engaged by the rolling elements being carefully ground to be free of defects. Although the solid rings are very satisfactory and produce excellent bearings having long load life, there are certain inadequacies and shortcomings which are difficult to eliminate.

One of the main inadequacies is that the solid rings retain the heat developed by the operation of the bearing. The removal of the heat by a flowing lubricant is also limited due to the solid nature of the rings. Although the rings are resilient and respond to the loads transmitted by the bearing, this resiliency is also limited to the inherent resiliency of the materal of the ring. This slow dissipation of the operating heat and restricted resiliency results in a further shortcoming that the bearing can overheat and the rolling and ring elements expand reducing the clearances and ultimately resulting in the freezing of the rings and the antifriction elements. The bearing then ceases to function as a bearing in any manner whatsoever. This is undesirable, since in many applications of bearings with antifriction elements, it is necessary that the bearing continue to provide relative rotation after the elements have failed to function properly.

Another difficulty or shortcoming encountered in solid rings is that the longitudinal graining of the tubular steel is cut in the grinding of the races, so that lateral grain orientation is engaged by the antifriction elements. It is well known that better performance is attained by the rolling antifriction element bearing against longitudinally orientated grains in the surface of the ring.

Also, due to the limited resiliency of the solid rings, it is not possible to provide the desired intal loadng between the antifriction elements to ensure proper operation of the bearing when no load is applied. A minimum amount of loading is required in order to ensure that the antifriction elements are rotated on relative movement of the inner and outer rings instead of a sliding action which is detrimental to the finally finished race surfaces.

It is, therefore, desirable to provide a bearing with rolling antifriction elements in which a greater control of the operating temperature and lubrication of the bearing is possible. Such a control permits operation of the bearing at a temperature to maintain a high sustained hardness in the race contacting areas for longer bearing life.

In addition, it is desirable to provide a controlled resiliency so that a more versatile bearing may be produced that is substantially less likely to freeze in operation due to overheating and failure of the bearing surfaces. Also, it is desirable to reduce the weight of the rings while at the same time reducing the cost of manufacture and improving the grain orientation of the surface engaged by the rolling elements.

An object of the invention is to provide a bearing of light weight that has increased heat dissipating properties and less likelihood of seizure than present bearings.

Another object of the invention is to provide a bearing having improved means for lubricating the wear surfaces and removing the heat from the bearing.

Another object of the invention is to provide a bearing having a controlled resiliency of the rings and providing a preloading in the desired amount of the bearing.

Another object of the invention is to reduce the cost of the materials and fabrication of the bearing, while improving the grain orientaton of the bearing surfaces.

Other and further objects and advantages will be apparent from the drawings in which FIG. 1 is a radial cross-sectional view taken along a radial plane containing the main axis of a bearing embodying the invention in the outer ring;

FIG. 2 is a sectional view along a radial plane containing the main axis illustrating a bearing with the inner and outer rings in accordance with the invention;

FIG. 3 is a radial cross-sectional view taken along a radial plane containing the main axis of a bearing with the invention illustrated in the inner and outer rings;

FIGS. 4 and 5 are radial sectional views along a radial plane containing the main axis of a bearing with the inner and outer rings;

FIG. 6 is a radial sectional view of a roller bearing taken along a radial plane containing the main axis with the outer ring preloaded;

FIG. 7 is a sectional view of an outer ring used in a preloaded roller bearing;

FIG. 8 is a radial sectional view taken along a radial plane containing the main axis of a roller bearing having an inner and outer ring in accordance with the invention;

FIGS. 9 to 12 are sectional views of outer rings in accordance with the invention having controlled resiliency;

FIG. 13 is a full sectional view of a ball bearing with an outer ring and a split inner ring in accordance with the invention; and FIG. 14 is a side view of one of the inner split rings of the embodiment of FIG. 13.

Referring to FIG. 1 of the drawing, the inner ring 10 is of a conventional type having a circular race 11 engaged by the bearing balls 12. The inner ring could be a rotatably supported shaft instead. A retainer 13 of a conventional type is provided to space the balls 12. The outer ring 14 comprises three parts 15, 16 and 17. These parts are preferably formed from sheet steel. The inner part 15 has a circularly bowed portion 18 with the center of the radius at point A. This bowed portion 18 is formed by bending the inner part. On the opposite edges of the bowed portion are cylindrical portions 20, 21. The radial part 16 extends normal to the main axis of the bearing and has an annular flange 22 on the outer edge thereof. The outer part 17 is also preferably made from sheet steel and comprises a cylindrical portion 23, a conical portion 24 and an annular flange portion 25 extending radially inwardly. The outer part 17 fits radially within the annular flange 22 and the annular flange portion 25 abuts against the outer surface of the cylindrical portion 21 of the inner part 15. The parts 15, 16 and 17 are secured together by welding or other suitable means to form a chamber 26 extending circumferentially completely around the main axis. The inner surface of the bowed portion is finished to form the outer race 27 engaged by the balls 12. The outer part 17 seats the bearing in the supporting structure (not shown) for receiving the load.

The hollow structure of the outer ring greatly lessens the weight of the bearing. The bearing load is transmitted through the part 16 and the flange 25 to the supporting structure. Thus the part 15 extends between force transmitting areas along the peripheral edges of the part 15. The part 15 has a thickness B to carry normal loads of the bearing. The ring will respond to the forces transmitted by the balls as in the present solid structure rings. However, a particular feature of this structure is that if the bearing overheats and the balls expand and reduce the radial clearances, the part 15 will bend or flex to accommodate the enlarged ball. The bearing will continue to rotate. This rotation will be at a substantially greater bearing torque.

A cooling fluid such as oil may be circulated through the chamber 26 to remove heat from the ring and the part 15. This substantially increases the dissipation of heat, lowering the operating temperature of the entire bearing. The cooling fluid may be supplied through fittings (not shown) mounted in the part 16.

The chamber 26 may be used to contain lubricating fluid for supplying lubricant to the races and balls. Bores 29 may be provided through the bowed portion 18 adjacent the cylindrical portions 20, 21, in order to be clear of the balls 12. Thus lubricant can be fed directly to the races.

Since the bowed portion 18 is bent from tubular sheet steel, the longitudinal grain structure is not disturbed by the formation of the race. The grains remain parallel to the surface of the race. The subsequent grinding and polishing operations on this bowed portion to provide the desired surface finish do not alter this parallel relationship, since the grains within the material are also parallel to the bowed surface. The relationship of the grain structure and race surface thus conforms to desired criteria and best wear characteristics.

In FIG. 2 another embodiment is illustrated in which the inner ring is in accordance with the invention. The part 30 is identical to the part 15 and is formed from tubular sheet steel. The bowed portion 31 is bent or creased and finished to form a race 32 centered about the point C which is a slightly greater radius than the radius of the balls 12. The outer part 33 has a cylindrical portion 34 with radially extending end flanges 35, 36. These flanges are welded or brazed to peripheral edge areas of the part 30. This forms a chamber 36 similar to the chamber 26 of the outer ring.

In FIG. 3 another embodiment of the invention is illustrated in which the ball bearing has an outer ring 40 and split inner rings 41, 42. Bearing balls 43 are positioned between the inner and outer rings and are spaced by a conventional retainer 44.

The outer ring is formed in two parts, an outer cylindrical part 45 and an inner part 46. The inner part 46 has a bowed portion 47, similar to the portions 18 and 31 of FIGS. 1 and 2. The surface is finished to form the race 48 having its center at D. Flanges or side pieces 49, 50, extend radially and perpendicularly from the edges of the part 45 in abutting relation with the inwardly facing surface of the outer cylindrical part 45. The flanges may be welded or brazed to the outer part. A chamber 51 is formed for circulation of cooling and lubricating fluid.

The split inner rings 41, 42, are identical and have inner cylindrical parts 51, 52, and ball bearing supporting parts 53, 54, respectively. The portions 55, 56, are shaped and finished to have the centers of the races 57, 58, at E and F, respectively. The balls 43 are thus engaged at two areas in order to absorb axial thrust from both sides of the bearings. The rings 41, 42, have cylindrical portions 59, 60, extending axially from the ball supporting portions 53, 54. Flanges 61, 62, 63, 64, extend radially and perpendicularly to the inner cylindrical parts 51, 52, and are attached thereto by welding or brazing to form annular chambers 65, 66, in the rings. Oil feed bores 67 are formed for feeding or draining lubricant. The rings 41, 42, are mounted on a shaft 68 which has an inner bore (not shown) to feed oil to a circumferential groove 69 for providing the bore 67 with lubricant.

In FIG. 4 the bearing is subject to a thrust load so that the balls 70 bear against the inner and outer rings 71 and 72 slightly off center so that the load between the balls and the rings is along a diameter at an angle to the radial plane. The lubricating orifice 73 may be located at the center of the race, since the ball is engaging the race in an area that is off center. Thus lubrication can be provided immediately adjacent to the load transmitting areas between the balls and races. Another feature of this embodiment which is also applicable to the embodiments of FIGS. 1 to 3 is the location of the lubricating orifices 74, 75, in the cylindrical ring lands 76 and 77 of the U-shaped sheet metal part 78 forming the outer ring. These orifices are in direct communication with the surfaces of the ring land and the retainer or cage 79.

The sides of the sheet metal part have triangular shaped beveled portions 80 and 81 for engaging the encompassing cylindrical sheet metal outer member 82 and secured thereto in a suitable manner. The inner ring 71 is similar to the outer ring 72 and has a U-shaped sheet metal member 84 forming the bowed race portion 85 and fastened to an inner cylindrical portion in a suitable manner to form the hollow inner ring. Both of the rings have chambers 86 and 87 for the circulation of a cooling and lubricating fluid.

In FIG. 5 another ball bearing subject to thrust load is illustrated in which the inner hollow ring 90 is formed by a U-shaped sheet metal member 92 with a bowed race portion 93. The member 92 is secured to the inner cylindrical member 94 to form the chamber 95. The inner ring 90 is mounted on a shaft 96 and the cylindrical member 94 has an opening 97 registering with the bore 98 in the shaft for the supply of lubricant and cooling fluid to the chamber 95. Lubricating orifice 99 may be centrally located, since the bearing area on the race is off center due to the axial thrust. As in the embodiment of FIG. 4, lubricating orifices 100 may be provided in the ring lands 102 for providing fluid between the land and the piloting surfaces on the cage 103. The outer ring 91 may be similar to the outer ring of the embodiment of FIG. 3.

In FIG. 6 a roller bearing is shown having a conventional inner ring 110 and a outer ring 111 in accordance with the invention. Rollers 112 and a cage 113 for spacing the rollers are also provided. The particular feature of this embodiment is that the U-shaped sheet metal member 114 forming the ring with the outer cylindrical member 115 has the lower engaging portion 116 bowed inwardly so that the surface 117 is slightly curved from a cylindrical surface. When the bearing is assembled, the lower engaging portion 116 is flexed outwardly into a cylindrical configuration so as to provide a predetermined inital loading of the rollers 112. This initial loading creates sufficient frictional force between a roller 112 and the portion 116 and the inner ring 110 so as to ensure the rotation of the roller 112 on the relative rotation of the inner and outer rings. In FIG. 7 the sheet metal member 114 is illustrated separate from the bearing to show the curving of the surface 117.

In FIG. 8 another roller bearing is shown having an inner ring 120 and an outer ring 121 in accordance with the invention. The outer ring 121 may be of the type shown in FIG. 6 with preloading or without preloading. The inner ring 120 is formed from a solid tubular steel. The ring is machined to form the inner groove 122 extending circumferentially around the ring for receiving the rollers 123. The ring is similarly machined on the inner side to form an annular groove 124. Thus an annular cylindrical part 125 is formed extending axially between the side portions 126, 127. The axial width of the groove 124 may be varied by the distance between the walls 128 and 129. This distance and the thickness of the annular cylindrical part 125 may be varied to adjust the resiliency of the cylindrical part 125. This will depend upon the characteristics desired for the bearing. An inner cylindrical part 130 formed from sheet metal extends between the sides 126, 127, to form the annular enclosed chamber 131 for circulating lubricating fluid. This may be provided in any suitable manner, such as through the sides 126, 127, or through the cylindrical part 130 in a manner similar to that shown in the embodiment of FIG. 5.

In FIGS. 9 to 12 various embodiments are shown for providing various degrees of resiliency of the outer ring of a ball bearing. In FIG. 9 the U-shaped cylindrical part 140 has an annular strut 141 extending radially between the center of the bowed portion 142 forming the race and the outer cylindrical member 143. In FIG. 10 the U-shaped sheet metal piece 150 has a bowed portion 151 forming the race and an outer cylindrical member 152 forming the enclosed chamber 153. At circumferentially spaced locations longitudinally or axially extending ribs 154 are secured to the member 152 to stiffen the outer ring. In FIG. 11 the U-shaped sheet metal portion 160 having the bowed portion 161 forming the race of the ring has a cylindrical circumferentially extending inner web 162 extending the axial length of the U-shaped sheet metal portion 160. The web is secured to the radially extending sides of the U-shaped portion and engages the bowed portion 161 to control the resiliency thereof. This forms two chambers 163, 164. A second U-shaped outer part 165 is attached to the web 162 to form the enclosed chamber 166. Orifices may be provided in the web 162 to provide for circulation of lubricant and cooling fluid between the chambers 163, 164, 166. Similarly, the U-shaped portion 160 may be provided with lubricating orifices similar to the embodiments of FIGS. 1 and 4.

In FIG. 12 the U-shaped portion 170 has a bowed portion 171 forming the race of the bearing. As is seen from the drawing, the thickness of the bowed portion 171 is thinner adjacent to the area engaged by the balls 172 to control the deflection and thereby the conformity between the ball and race. As in the other embodiments, an outer cylindrical member 173 is provided to form the enclosed cooling and lubricating chamber 174.

In FIGS. 13 and 14 a specific embodiment of the invention is illustrated which is similar to the embodiment of FIG. 3. The outer ring 180, which is similar to the outer ring 40 of FIG. 3, has a U-shaped part 181 with a bowed portion 182 forming the race of the outer ring. The sides 183, 184, extend radially and are suitably attached to the outer cylindrical part 185 to form the enclosed chamber 186. The split inner rings 187, 188 are slightly different in construction. The inner ring 188 has a U-shaped part 189 with the flange or side 190 shorter than the flange or side 191. The sheet metal part 192 has a land 193 and a curved portion 194 forming one side of the race. As in the embodiment of FIG. 3 the ball 196 engages the curved portion along an area 197. The parts 189 and 192 form the enclosed chamber 198 for cooling fluid. The ring 187 has a U-shaped part 200 which is narrower in axial width to accommodate the annular flange 201 between the sides 202 and 190 of the rings 187 and 188. The flange 201 extends from the curved portion 203 of the part 204 extending between the sides 202 and 205. This forms the enclosed chamber 206. The part 204 has a land 207 comparable to the land 193 on the ring 188. The curved portion 203 forms a race engaged by the ball 196 in area 208. Thus the curved portions 194 and 203 form a space with the ball 196 between the areas 197 and 208. Flange 201 has orifices 210 extending at an angle to the radius of the bearing. These orifices communicate with the groove 211 formed by the sides 190 and 202. As in the embodiments of FIGS. 3 and 5 a shaft (not shown) has passages providing lubricant to the orifices 210 for the bearing areas 197 and 208. A cage 212 is provided to ride on the lands 193 and 207. The chambers 186, 198 and 206 may provide cooling fluid. The portion or part of the bearings with the bearing surfaces or races engaged by the rolling antifriction elements, such as inner parts 15 and 46, the roller engaging portion 116 and the annular portions with the U-shaped pieces 140, 150, 160, 170, is preferably made of sheet metal and has a substantially greater lateral or axial width than thickness to render the bearings controllably yieldable to pressures applied through the bearing surfaces or races.

The hollow ring has many advantages. The supporting of the race member between the sides imparts a resiliency to the race that may be controlled by the design and configuration of the sheet metal pieces. This lends a versatility to the design of hollow rings not available in solid rings. The resiliency permits a radial expansion of the race portions when thermal gradients cause internal radial loading. In conventional bearings not having such resiliency such internal loading can result in catastrophic failure.

Also in addition to the control of the resiliency of the ring, the ring may be biased positively so as to impart a preload to the bearing for improving its performance at no or light loads. The utilization of sheet metal not only reduces the weight of the bearing, but also permits the use of less expensive material, since tubular sheet metal may be used and shaped to form the bowed portion or race and the sides of the hollow ring.

Although the invention has been described in connection with the preferred sheet metal material, many of the advantages can be realized from the use of solid pieces machined to the desired thickness. An important feature applicable to both forms is the greater control of the operating temperature and lubrication. The level of the operating temperature of the bearing is important. As the level of operating temperature is raised, the hardness of the races decreases. Hardness is a function of temperature and decreases as temperature increases. Longer bearing life is obtained with higher hardness. In view of the improved cooling and lubrication the temperature of the bearing may be controlled and maintained at lower values. Thus the bearings may be operated at a higher hardness with a consequent increase in bearing life.

Further, the enclosed chamber formed by the ring permits the circulation of a cooling medium within the ring that impinges upon the bowed portion and the U-shaped portion for a rapid extraction of heat. In addition, the cooling medium may be a lubricating oil and the location of the chamber permits the direct feeding or lubricating of engaging or rubbing surfaces through orifices from the chamber to the area requiring lubrication, thus avoiding many of the design difficulties in securing an adequate flow of lubricant through the engaging or rubbing surfaces.

The cutting and the bending and welding of the parts of the ring together is a simpler manufacturing operation than the cutting and grinding of the solid rings. The rings made from sheet metal may be machined or otherwise processed to secure the desired dimensions and finish. These operations, however, are materially less than with conventionel solid rings. Thus a less expensive manufacturing procedure requiring less manipulation than the forming of a solid ring is attained.

In addition to the lower forming cost, an improved grain orientation is attained. The bowing of the sheet metal tubular form still retains the parallel orientation of the metal grains to the surface of the bowed portion. The subsequent polishing of the race in the bowed portion does not remove this longitudinal orientation. Thus the balls are engaging the long sides of the grains rather than lateral cross sections as is the case with solid rings.

A particular feature of the foregoing embodiments is the distribution and transmittal of the forces applied to the rings. The applied load is transmitted to the sides of the U-shaped portion. The reaction is applied by the antifriction element at the race, which is intermediate to the sides of the ring. The span between the forces produces a flexing of the U-shaped portion resulting in the surface of the race being placed in compression and increasing the area of contact between the race and balls as the curvature of the race increases. The degree of flexure can be controlled by the thickness of the sheet metal, the size of the ring and the selection of the configuration and design of the hollow ring as illustrated in the drawings. The compression of the race surface creates desirable stresses between and within the grain structure of the surface so as to increase the resistance to wear and pitting. Thus the control of the resiliency of the ring introduces a wider range of design features to the bearing.

It is thus seen from the foregoing that a new and improved bearing ring has been described. Various modifications and changes may be made in the embodiments shown and described without departing from the invention as set forth in the appended claims.

I claim:
1. A bearing comprising
   a first member having a first bearing surface for engagement by rolling antifriction elements,
   a second member having a second bearing surface for engagement by rolling antifriction elements and facing said first bearing surface,
   rolling antifriction elements between said first and second bearing surfaces in engaging force-transmitting relation therewith,
   characterized by one of said members having
      a race part with said other respective bearing surface and of substantially greater width than thickness to render said race part yieldable,
      a supporting part spaced from and generally parallel to said race part,
      sides extending between said race part and said supporting part for supporting said race part along opposite edges and
      strut means extending along said parts in direction of movement of said rolling antifriction elements and positioned centrally between said sides and engaging said race and supporting parts to separate said one member into two portions controllably yieldable to pressures between said rolling antifriction elements and said bearing surfaces.
2. A bearing as set forth in claim 1 wherein said race part is formed from sheet metal having grain orientation parallel to the surface of engagement of said rolling antifriction elements on said other respective bearing surface.
3. A bearing as set forth in claim 2 wherein said supporting part, said sides and said strut means are made of sheet metal.
4. A bearing as set forth in claim 1 wherein said other member is ring-shaped and said parts are of a generally annular shape and said sides and strut means extend radially to form a radial bearing.
5. A bearing as set forth in claim 1 wherein said strut means is positioned at the middle of a respective bearing surface.
6. A bearing as set forth in claim 2 wherein said other member has
   a second race part with said other respective bearing surface and formed from sheet metal having grain orientation parallel to the surface of engagement of said rolling antifriction elements on said other respective bearing surface and of substantially greater width than thickness to render said second race part yieldable,
   a second supporting part spaced from and generally parallel to said second race part,
   second sides extending between said second race part and second supporting part for supporting said second race part along opposite edges and
   second strut means extending along said second parts in direction of movement of said rolling antifriction elements and positioned centrally between said second sides and engaging said second race and supporting parts to separate said other member into two portions controllably yieldable to pressures between said rolling antifriction elements and said bearing surfaces.
7. A bearing as set forth in claim 6 wherein said one member is ring-shaped and said second parts are of a generally annular shape and said second sides and strut means extend radially to form a radial bearing.
8. A bearing as set forth in claim 2 wherein said race part has orifices for transferring liquid to lubricate said bearing.
9. A bearing as set forth in claim 2 wherein said strut means extends generally normal to said parts.
10. A bearing as set forth in claim 2 wherein said race-part is axially curved to form said bearing surfaces and said rolling antifriction elements are bearing balls.
11. A bearing as set forth in claim 2 wherein a cage is provided for spacing said rolling antifriction elements and said race part has lands with orifices for lubricating the cage.

References Cited
UNITED STATES PATENTS

| | | | |
|---|---|---|---|
| 665,872 | 1/1901 | Brueggemann | 308—187 |
| 1,305,131 | 5/1919 | Leon | 308—184 |
| 1,387,993 | 8/1921 | Leon | 308—184 |
| 2,217,801 | 10/1940 | Katcher | 308—187 |

FOREIGN PATENTS 206,530  11/1923  Great Britain.

MARTIN P. SCHWADRON, *Primary Examiner.*

FRANK SUSKO, *Assistant Examiner.*